July 7, 1936.  W. A. RAY  2,046,882
VALVE AND CONTROL SYSTEM
Filed Jan. 23, 1934
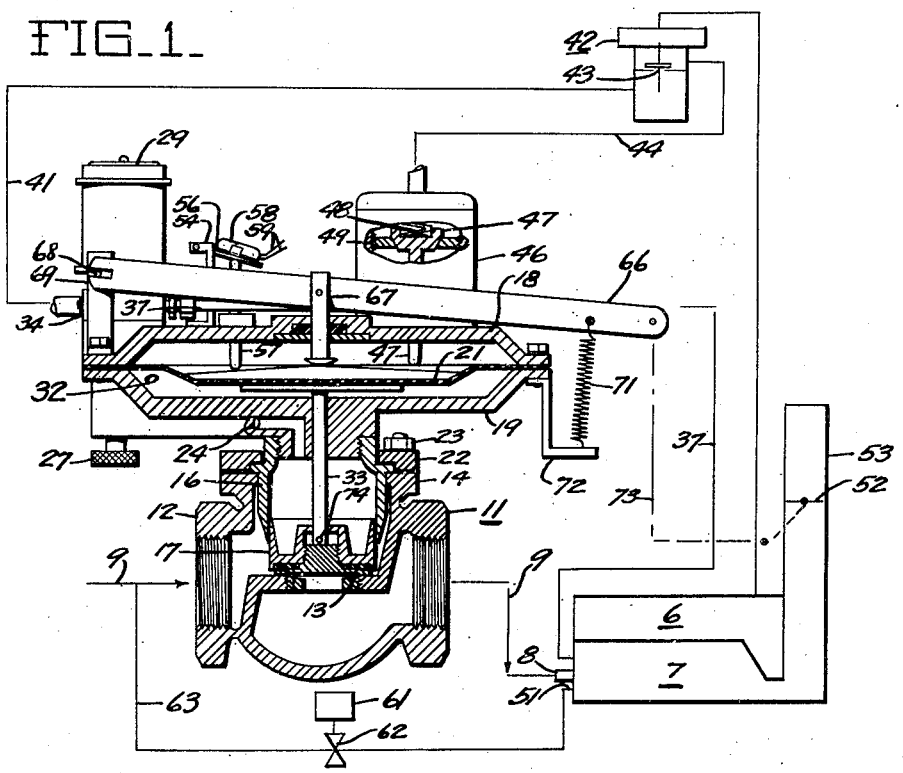
FIG. 1.
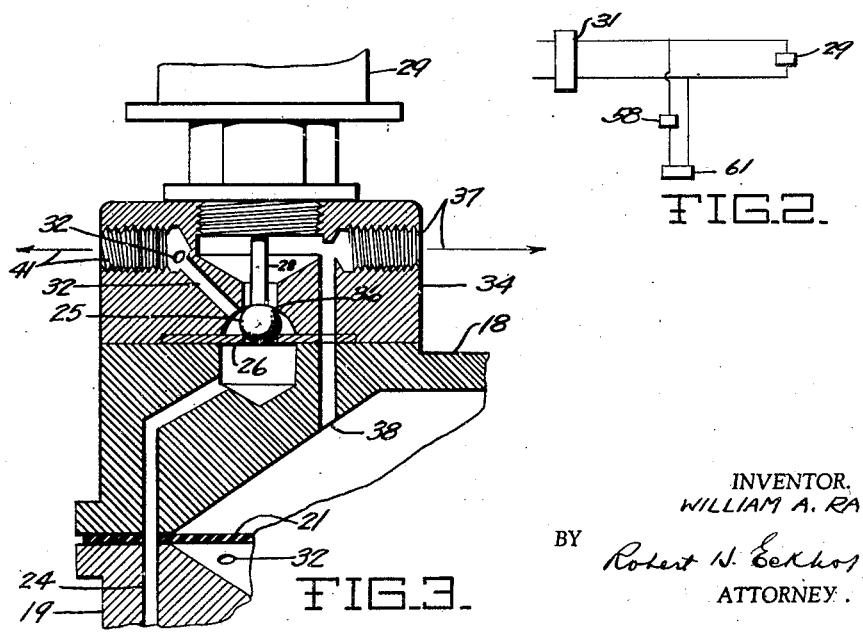
FIG. 2.
FIG. 3.
INVENTOR.
WILLIAM A. RAY
BY Robert N. Eckhoff
ATTORNEY.

Patented July 7, 1936

2,046,882

UNITED STATES PATENT OFFICE 2,046,882

VALVE AND CONTROL SYSTEM

William A. Ray, San Francisco, Calif., assignor to General Controls Co., a corporation of California Application January 23, 1934, Serial No. 707,904

26 Claims. (Cl. 236—80)

This invention relates generally to the control of heat utilizing units and more particularly to the control of a combustible fuel thereto. More particularly, it relates to control devices including a novel control and valve arrangement and construction.

The invention is disclosed in connection with a pilot ignited main burner, the latter being operated under the control of a diaphragm operated valve. The invention is concerned not only with an improved system of control for a burner and details thereof, but also with the mechanical construction and details thereof.

The objects of the invention include, generally, improvements in these, as well as certain novel constructions. The aforesaid objects and others as well will appear in detail in connection with the disclosure of the system and devices employed wherein the present preferred form of the devices embodying the invention have been set forth.

In the drawing;

Figure 1 includes a section through a valve in conjunction with a schematic showing of a system in which it can be successfully utilized.

Figure 2 is a diagram of a circuit.

Figure 3 is a fragmentary section showing the mounting of a pilot valve and certain construction details.

In the drawing I have disclosed my invention as applied to a heat utilizing unit as boiler 6 supplied with heat from furnace 7. Of course, another unit can replace the boiler; for instance, a hot air furnace can be used. The furnace includes a burner 8 which is supplied with a combustible fuel. In disclosing my invention I have employed gas as the fuel since the invention is particularly adapted thereto, although the invention can be used with other fuels as oil.

The gas is supplied to the burner by a line 9 under the control of a valve generally indicated at 11. This includes a valve body 12 having an inlet and an outlet and a valve seat 13. The valve body includes a flange 14 upon which a sleeve member 16 is rotatably seated. A valve member 17 is movable up and down in the sleeve and cooperates with the seat to control flow through the valve. The valve member and the valve are provided so that the valve member is subject to the inlet fluid pressure, there being a slight clearance between the valve member and sleeve 16 so that the inlet pressure forces the valve member to engage and seat upon the valve seat.

A diaphragm chamber, including upper portion 18 and lower portion 19 on opposite sides of a diaphragm 21, is provided. The lower portion is screwed into sleeve member 16 and is carried thereby. Since the sleeve is rotatable on the valve body, the diaphragm chamber can be placed in any rotated position with respect to the valve body. The utility of this will appear in connection with the control of a furnace or burner condition device, as will presently appear. A ring 22 is recessed to engage member 16 and retain it against rotation on flange 14, studs 23 being provided.

The pressure of the fluid inlet is employed as the actuating force to open and close the valve. To this end a passage 24 is provided. This extends through the lower diaphragm portion 19, the diaphragm 21 and the upper portion 18 to pilot valve ball member 25 and valve seat 26. Flow of fluid through passage 24 is under the control of a metering device indicated by screw 27; this controls the rate of movement of the diaphragm and enables the rate to be altered.

The valve ball 25 is carried by a rod 28. This rod is raised upon energization of a solenoid indicated by 29. The solenoid is controlled by a suitable control device 31 which can include a time clock and a thermostat as well as other known control units utilized in circuits of this character. When the solenoid is energized the valve member 25 is raised from its associated seat and fluid, usually gas, can pass the valve member and into passage 32 which extends through the constituents of the diaphragm chamber to the lower side of the diaphragm. The inlet pressure on the under side of the diaphragm exerts a force sufficient to open the valve, the diaphragm being connected by rod 33 to the valve member 17. The rod has a sliding fit in the lower portion 19, and is substantially fluid tight.

The solenoid 29 is screwed into a casting 34 which is secured to portion 18 by studs, not shown. This casting has a recess in which valve seat 26, a washer, is provided—a simple and advantageous construction. The casting is recessed to receive the ball 25 and to provide a second valve seat 36 which the ball 25 engages to close off fluid passage to vent 37 which leads to furnace 7. A passage 38 also opens into the vent from upper portion 18.

A line 41 extends from passage 32 to a device generally indicated by 42 which includes a valve 43. Normally this valve is maintained closed so that the inlet fluid pressure can not pass through line 44 to the upper chamber portion 18 to close the valve 11. However, when the device 42, which can be responsive to some condition, as boiler pressure or any other controllable condition, is actuated, opens the valve 43, fluid passes to the upper side of the diaphragm to move the valve member 17 toward the seat 13 even though solenoid 29 is still energized. In some cases, line 44 may vent directly into the furnace and spring 71 returns the valve to its seat.

In practice, I have preferably arranged control between control devices 31 and 42 so that even after device 42 was actuated to open valve 43, the burner 8 continued in operation but at a reduced rate until device 42 again called for full burner operation or the burner was cut off by deenergization of solenoid 29 by device 31. For example, device 31 can be set to maintain a pressure of 100 pounds in boiler 6 and device 42 to call for low burner operation at a pressure of 98 pounds. Low burner operation is secured by means of valve 46 mounted in the upper portion 18.

Valve 46 includes valve member 47 urged by spring 48 to engage adjustable seat 49. Valve member 47 extends through portion 18 and engages the diaphragm and is held off the seat 46 whenever the diaphragm is in a raised position so that, if device 42 permits fluid pressure to pass valve 43, the pressure can pass to the upper side of the diaphragm from valve 46 when member 47 is off its seat. However, seat 49 is adjusted so that valve member 47 seats thereon before valve member 17 engages seat 13 and fuel can still pass to burner 8, although at a low rate. If the pressure, for instance, is raised to 100 pounds, device 31 cuts off the solenoid 31 and ball member 25 closes passage 24 and the valve member 17 completes its travel to close valve 11.

While the upper side of the diaphragm is vented through passage 38 and pipe 37 so that gas admitted through devices 43 and 47 is vented, this venting does not cause the diaphragm to close the valve so long as solenoid 29 maintains ball valve 36 raised. It is to be noted valve member 47 rides the diaphragm and engages its seat before valve member 17 engages its seat. With valve member 47 in closed position, the full line pressure is placed on the diaphragm. The net result is that with device 42 open, the valve member 17 can drop to a lower position in which it floats so that a low fire is secured.

Opening movement of the diaphragm is also employed to condition devices affecting burner and furnace operations. Thus, this movement is utilized, in the system disclosed, to control a pilot burner 51 for the main burner as well as other devices as the damper 52 in stack 53 or louvers on the burner.

To control the pilot 51, a bracket 54 is secured on portion 18. A hinge 56 is mounted thereon and is raised and lowered by rod 57 which extends through a seal in the portion 18 to engage both the diaphragm and the hinge. A glass tube 58 is secured on the hinge and includes electrodes 59 which are connected by a body of mercury in the tube when the hinge is in that position shown in Figure 1, so that if device 31 energizes solenoid 29, current also passes to energize solenoid 61. This solenoid operates a valve 62, the whole device being similar to solenoid 29 and its valve, although valve 62 is a simple structure controlling flow through line 63 to pilot burner 51, said flow being a minor one compared to the major flow through valve 11. As soon as the diaphragm has raised to open valve 11, the hinge is tilted into a position wherein the body of mercury does not connect the electrodes and the circuit to solenoid 61 is broken so that the pilot burner shuts off. Device 31, in conjunction with the electrodes 59, controls an electrical igniter for the pilot burner or an expanding flame pilot burner, so that the pilot operation is automatic as well as economical.

Stack damper 52, shown as typical of a furnace or boiler control device, is also controlled by the operation of the diaphragm. In the specific form disclosed, an arm 66 is mounted on a rod 67 having a head engaging the diaphragm, the end of the arm being bifurcated to receive a pin 68 on bracket 69. The rod extends through a suitable seal in portion 18. The arm is preferably pulled clockwise by a spring 71 between the arm and a bracket 72. A connection 73 extends directly between the arm and the device to be operated, or to a supplementary mechanism for operating the device directly if too much power is required. In this way, the boiler or furnace conditioning device or devices can be operated in conjunction with the main valve 11 and burner 8.

A spring 71 is preferably utilized as the bias means on arm 66 because, as the arm lifts, the pull exerted by the spring increases and does not remain constant. As the diaphragm lifts its effective area decreases by about 35% so that the spring can balance the lift very closely. If a mere fixed weight were used, its force remains constant and the approximate balancing would not be secured.

I have found it preferable that some devices as the stack damper or furnace louvers be opened before the main burner operates. To accomplish this, I preferably include a lost motion connection between the diaphragm and the main valve member 17. Pin 74 does not engage member 17 to raise the member until the diaphragm has moved some distance and the pilot valve 62 and the stack damper opened. The ability to rotate the diaphragm chamber carrying the arm 66 enables the arm to be used with great ease to control a damper or louvers since it obviates the necessity of running the connection from the arms so as to make a turn.

I claim:

1. In combination, a valve seat between a fluid inlet and a fluid outlet, a cooperative valve member for said seat controlling supply of fluid fuel to a heat utilizing unit, a diaphragm chamber, a diaphragm in said chamber, connecting means between said diaphragm and said valve member including a lost motion connection, a conduit from said fluid inlet to one side of said diaphragm in said chamber, a pilot valve for controlling fluid flow therethrough, a conduit for admitting fluid to the other side of said diaphragm in said chamber, and means responsive to a condition of said heat utilizing unit for passing fluid through said last mentioned conduit.

2. In combination, a valve seat between a fluid inlet and a fluid outlet, a cooperative valve member for said seat controlling supply of fluid fuel to a heat utilizing unit, a diaphragm chamber, a diaphragm in said chamber, connecting means between said diaphragm and said valve member including a lost motion connection, a conduit from said fluid inlet to one side of said diaphragm in said chamber, a pilot valve for controlling fluid flow therethrough, a conduit for admitting fluid to the other side of said diaphragm in said chamber, means responsive to a condition of said heat utilizing unit for passing fluid through said last mentioned conduit, and means for interrupting fluid passage through said last mentioned conduit when said diaphragm reaches a predetermined position.

3. In combination, a valve seat between a fluid inlet and a fluid outlet, a cooperative valve member for said seat controlling supply of fluid fuel to a heat utilizing unit, a diaphragm chamber, a diaphragm in said chamber, connecting means between said diaphragm and said valve member including a lost motion connection, a conduit from said fluid inlet to one side of said diaphragm in said chamber, a pilot valve for controlling fluid flow therethrough, a conduit for admitting fluid to the other side of said diaphragm in said chamber, means responsive to a condition of said heat utilizing unit for passing fluid through said last mentioned conduit, and means for interrupting fluid passage through said last mentioned conduit when said diaphragm reaches a predetermined position wherein said valve member is separated from said valve seat to permit fluid to pass from said inlet to said outlet.

4. In combination, a burner, a valve including a valve body having an inlet and an outlet, a valve seat therebetween, a valve member cooperating with said member to control a major flow of fluid through said seat to said burner, a movable diaphragm, means including lost motion connecting said diaphragm to said valve member to open and close the valve, a passage for a minor flow of fluid past said valve to a pilot burner igniter for said burner, a pilot valve controlling flow through said passage, and means for opening said pilot valve upon initial movement of said diaphragm and for closing said valve after said diaphragm has opened said first mentioned valve.

5. In combination, a burner, a valve including a valve body having an inlet and an outlet, a valve seat therebetween, a valve member cooperating with said member to control a major flow of fluid through said seat to said burner, a movable diaphragm, means including lost motion connecting said diaphragm to said valve member to open and close the valve, a passage for a minor flow of fluid past said valve to a pilot burner igniter for said burner, a pilot valve controlling flow through said passage, and means for opening said pilot valve upon initial movement of said diaphragm.

6. In combination, a burner, a valve including a valve body having an inlet and an outlet, a valve seat therebetween, a valve member cooperating with said member to control a major flow of fluid through said seat to said burner, a movable diaphragm, means including lost motion connecting said diaphragm to said valve member to open and close the valve, a first pilot valve controlling valve opening and closing movement of said diaphragm, a passage for a minor flow of fluid past said valve to a pilot burner igniter for said burner, another pilot valve controlling flow through said passage, and means for opening said pilot valve upon initial movement of said diaphragm.

7. In combination, a valve seat between a fluid inlet and a fluid outlet, a cooperative valve member for said seat controlling supply of fluid fuel to a heat utilizing unit, a diaphragm chamber, a diaphragm in said chamber, connecting means between said diaphragm and said valve member including a lost motion connection, a conduit from said fluid inlet to one side of said diaphragm in said chamber, a pilot valve for controlling fluid flow therethrough, a second conduit communicating with said pilot valve, and means responsive to a condition of said heat utilizing unit for controlling fluid passage through said second conduit.

8. In combination, a fluid flow control valve, a diaphragm for operating said valve, a conduit for fluid flow from an inlet to said valve to one side of said diaphragm to operate said valve, a valve control means operable to control fluid flow through said conduit to control said valve, and a control release valve means operable by said diaphragm to release only partially fluid pressure on said one side of said diaphragm.

9. In combination, a fluid flow control valve, a diaphragm for operating said valve, a conduit for fluid flow from an inlet to said valve to one side of said diaphragm to operate said valve, a valve control means operable in response to one condition to control fluid flow through said conduit to control said valve, and a control release valve means operable by said diaphragm between two positions thereof to release only partially fluid pressure on said one side of said diaphragm.

10. In combination, a fluid flow control valve, a diaphragm for operating said valve, a conduit for fluid flow from an inlet to said valve to one side of said diaphragm to operate said valve, a valve control means operable in response to one condition to control fluid flow through said conduit to control said valve, and a control release valve means operable by said diaphragm to release only partially fluid pressure on said one side of said diaphragm to cause said diaphragm to close partially said valve.

11. In combination, a fluid flow control valve, a diaphragm for operating said valve, a conduit for fluid flow from an inlet to said valve to one side of said diaphragm to operate said valve, a valve control means operable in response to one condition to control fluid flow through said conduit to control said valve, and a control release valve means operable upon movement of said diaphragm between two limit positions thereof to release at least partially the pressure on said one side of said diaphragm.

12. In combination, a fluid flow control valve, a diaphragm for operating said valve, a conduit for fluid flow from an inlet to said valve to one side of said diaphragm to operate said valve, a valve control means operable in response to one condition to control fluid flow through said conduit to control said valve, and a control release valve means operable to release at least partially the pressure on said one side of said diaphragm to the other side of said diaphragm to cause at least a partial closing of said valve.

13. In combination, a fluid flow control valve, a diaphragm for operating said valve, a conduit for fluid flow from an inlet to said valve to one side of said diaphragm to operate said valve, a valve control means operable to control fluid flow through said conduit to control said valve, a pressure release control means operable to release fluid pressure in said conduit, and means responsive to movement of said diaphragm for controlling release of said pressure to the other side of said diaphragm.

14. In combination, a fluid flow control valve, a diaphragm for operating said valve, conduits for admitting fluid pressure from an inlet to said valve to one side of said diaphragm to open said valve and to the other side of said diaphragm to close said valve partially or wholly after opening thereof, a first valve control means operable to admit fluid to said one side of said diaphragm to open said valve, a second valve control means movable by said diaphragm to control release of pressure on said one side of said diaphragm, and means operable by an external condition for superimposing control on pressure released by said second means to enable said external condition to control said fluid flow control valve.

15. In combination, a fluid flow control valve, a diaphragm for operating said valve, conduits for admitting fluid pressure from an inlet to said valve to one side of said diaphragm to open said valve and to the other side of said diaphragm to close said valve partially or wholly after opening thereof, a first valve-control means operable upon a first external condition to admit fluid to said one side of said diaphragm to open said valve, and a second valve control means operable to release pressure on said one side of said diaphragm to the other side thereof.

16. In combination, a valve body having an inlet and an outlet, a valve seat and a valve member, a diaphragm chamber including a movable diaphragm for moving said valve member to and from said seat, a fluid passage from said inlet to one side of said diaphragm, a first control device for controlling release of fluid from said one side of said diaphragm, and a second control device controlling fluid released by said first control device in accordance with movement of said diaphragm.

17. In combination, a valve body having an inlet and an outlet, a valve seat and a valve member, a diaphragm chamber including a movable diaphragm for moving said valve member to and from said seat, a fluid passage from said inlet to one side of said diaphragm, a first control device for controlling release of fluid from said one side of said diaphragm, and a second control device controlling fluid released by said first control means and operable by said diaphragm only in a portion of the path of movement of said diaphragm.

18. In combination, a valve including a cooperating seat and valve member, a diaphragm chamber including a diaphragm, means including lost motion for raising said valve member from said seat only after initial movement of said diaphragm has occurred, a movable member supported above said chamber, and another member movable by said diaphragm and independently thereof for moving said movable member.

19. In combination, a valve including a cooperating seat and valve member, a diaphragm chamber including a diaphragm, a passage for fluid to one side of said diaphragm in said chamber, a first valve movable between an open and closed position to control flow through said passage, a second valve for varying flow rate through said passage to control the rate of movement of said diaphragm, means including lost motion for raising said valve member from said seat upon initial movement of said diaphragm, a movable member supported above said chamber, and another member movable by said diaphragm and independently thereof for moving said movable member.

20. In combination, a fluid flow control valve, a diaphragm for operating said valve, a conduit for fluid flow from an inlet to said valve to one side of said diaphragm to operate said valve, a valve control means operable to control fluid flow through said conduit to control said valve, a first control release valve means operable to release only partially fluid on said one side of said diaphragm, and a second control means superimposing control over said first mentioned control means and rendering said first control means ineffective to release said pressure.

21. In combination, a valve including a cooperating seat and valve member, a diaphragm chamber including a diaphragm, a passage for fluid to one side of said diaphragm in said chamber, a first valve movable between an open and closed position to control flow through said passage, means including lost motion for raising said valve member from said seat only after initial movement of said diaphragm, a movable member supported above said chamber, and another member movable by said diaphragm and independently thereof for moving said movable member.

22. In combination, a valve including a cooperating seat and valve member, a diaphragm chamber including a diaphragm, a passage for fluid to one side of said diaphragm in said chamber, a first valve in said passage, a solenoid mounted on said chamber for moving said first valve between an open and closed position to control flow through said passage, means including lost motion for raising said valve member from said seat only after initial movement of said diaphragm, a movable member supported above said chamber, and another member movable by said diaphragm and independently thereof for moving said movable member.

23. In combination, a valve including a cooperating seat and valve member, a diaphragm chamber including a diaphragm, a passage for fluid to one side of said diaphragm in said chamber, a first valve in said passage, a solenoid mounted on said chamber for moving said first valve between an open and closed position to control flow through said passage, a second valve for varying flow rate through said passage to control the rate of movement of said diaphragm, means including lost motion for raising said valve member from said seat only after initial movement of said diaphragm, a movable member supported above said chamber, and another member movable by said diaphragm and independently thereof for moving said movable member.

24. In combination, a valve including a cooperating seat and valve member, a diaphragm chamber including a diaphragm, a passage for fluid to one side of said diaphragm in said chamber, a first valve movable between an open and closed position to control flow through said passage, a second valve for varying flow rate through said passage to control the rate of movement of said diaphragm, means including lost motion for raising said valve member from said seat upon initial movement of said diaphragm, a movable member supported above said chamber, and another member movable by said diaphragm upon initial movement thereof and independently thereof for moving said movable member.

25. In combination, a valve including a cooperating seat and valve member, a diaphragm chamber including a diaphragm, a passage for fluid to one side of said diaphragm in said chamber, a first valve in said passage, a solenoid mounted on said chamber for moving said first valve between an open and closed position to control flow through said passage, means including lost motion for raising said valve member from said seat only after initial movement of said diaphragm, a movable member supported above said chamber, and another member movable by said diaphragm upon initial movement thereof and independently thereof for moving said movable member.

26. In combination, a valve body having an inlet and an outlet and including a valve seat, a valve member movable to and from said seat, a diaphragm chamber including a movable diaphragm, means connecting said diaphragm to said valve member to move said valve member, said chamber including a lower body member mounted on said valve body, a passage for fluid from the inlet side of said valve body, and a valve member extending into said passage to vary fluid flow through said passage to one side of said diaphragm.

WILLIAM A. RAY.